UNITED STATES PATENT OFFICE.

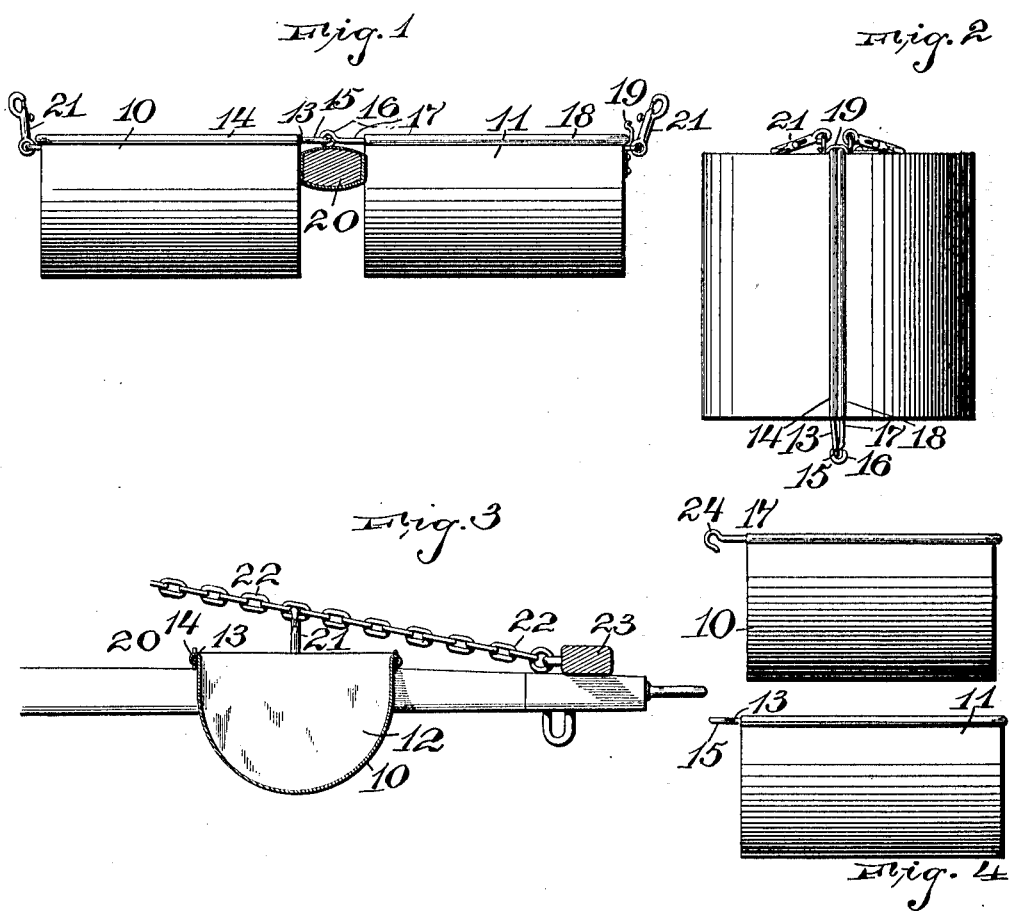

HENRY HOFFMANN, OF NEWARK, NEW JERSEY.

FEED-TROUGH FOR ANIMALS.

1,035,588.  Specification of Letters Patent. Patented Aug. 13, 1912.

Application filed December 11, 1908. Serial No. 466,933.

*To all whom it may concern:*

Be it known that I, HENRY HOFFMANN, a citizen of the United States, residing at Newark, in the county of Essex and State of New Jersey, have invented certain new and useful Improvements in Feed-Troughs for Animals; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved feed-trough or box which is adapted to form two receptacles, these receptacles comprising members that can be folded and which, when extended, are adapted to be supported on a wagon-tongue. The feed-trough thus comprises two members which, when extended, flank the wagon-tongue and are supported on each side thereof, and the members are adapted to be folded by being hinged on one another or arranged so that they nest, and when so folded can be used for carrying the fodder for the horses to be fed.

The invention further consists in providing the outer or free ends of the members, when they are extended, with means for detachably securing them to a part of the harness or a part of the wagon so that the device cannot be upset by an excess of pressure on one member.

The invention is illustrated in the accompanying drawing, in which—

Figure 1 is a front view of the feed-trough extended and arranged on a wagon-tongue, and Fig. 2 is a side view of the same removed and folded. Fig. 3 is a section of Fig. 1 taken through one of the members of the feed-trough and showing the wagon-tongue in elevation. Fig. 4 is a view of a modified form of construction.

The device consists of two members 10 and 11 which are U-shaped in transverse section, as will be seen from Fig. 3, and have closed ends 12 whereby each member forms a trough or box open at the top. Around the top edge of one member, such as 10, is placed a rib or wire 13 over which the material comprising the sides of the member is folded and forms a bead 14, and the ends of the wires 13 are bent into the eyes 15 which receive the hooks 16 of the wire 17 which passes around the other member 11 and is clamped thereto by the bead 18. The two members are thus made to fold by being in hinged relation, and when folded, as in Fig. 2, a spring 19 is adapted to snap over the beads and hold the two members together. When assembled or folded, as in Fig. 2, they can be used for transportation of food or any other substance, and can be thus used for a reservoir for fodder when an extended time is going to be consumed in the travel of a team. When extended the two members are supported, by their connecting wires 13 and 17, on the wagon-tongue 20, the two opposed sides of the members 10 and 11, which sides are straight and when the members are extended are in parallel relation, fitting against the sides of the wagon-tongue and tending to hold the same in a fixed position, although the trough can be slid along the wagon-tongue when necessary. I prefer however to provide the outer ends of the members with the hooks 21 which are preferably snap hooks, and that can be snapped into the pole chains 22, or into any other convenient element, although the chains 22 are preferred, since they are handy in most trucking harness, running back to the harness from the neck-yoke 23 shown in Fig. 3. The engagement of the snap hooks 21 with the pole chains 22 while it serves to hold the feed trough against undue tilting, also acts to slightly separate the pole chains if they are too close together for the handy feeding of the horse, and thus holds the chains separated slightly, as will be evident. The members 10 and 11 may be formed as in Fig. 4, with the wire 17 having a hook 24 which is open sufficiently to make it detachable from the eyes 15, one of the members being made smaller than the other so that they can nest, one being placed inside of the other when they are folded. Fig. 4 shows the smaller of the members suspended over the larger one.

Having thus described my invention, what I claim is:—

The combination of a wagon-tongue and the pole chains thereof, of a feed-trough comprising two members having a hinged connection, the hinged connection being so disposed that the members are spaced apart when they are in line so that they rest on the wagon-tongue, the inner sides of the members engaging the wagon-tongue and snap hooks on the outer ends of the members for engaging the pole chains for holding the feed-trough in position and for spreading the pole chains to permit the handy feeding of the animals.

In testimony, that I claim the foregoing, I have hereunto set my hand this 9th day of December 1908.

HENRY HOFFMANN.

Witnesses:
WM. H. CAMFIELD,
E. A. PELL.

Copies of this patent may be obtained for five cents each, by addressing the "Commissioner of Patents, Washington, D. C."